(12) United States Patent
Hunzinger

(10) Patent No.: US 7,009,947 B2
(45) Date of Patent: Mar. 7, 2006

(54) INTEGRITY OF PILOT PHASE OFFSET MEASUREMENTS FOR PREDICTING PILOT STRENGTH

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 1029 days.

(21) Appl. No.: 10/035,369

(22) Filed: Oct. 26, 2001

(65) Prior Publication Data

US 2002/0059036 A1 May 16, 2002

Related U.S. Application Data

(60) Provisional application No. 60/245,363, filed on Nov. 2, 2000.

(51) Int. Cl.
*H04Q 7/00* (2006.01)
(52) U.S. Cl. .................. 370/328; 370/320; 370/332; 370/335; 370/342; 375/140; 375/142; 375/143; 375/144; 375/145; 375/150; 375/152

(58) Field of Classification Search .............. None
See application file for complete search history.

(56) References Cited

U.S. PATENT DOCUMENTS

| 5,799,010 A | * | 8/1998 | Lomp et al. ............. 370/335 |
| 6,229,843 B1 | * | 5/2001 | Lomp et al. ............. 375/150 |
| 6,389,087 B1 | * | 5/2002 | Heinonen et al. ......... 375/354 |

* cited by examiner

*Primary Examiner*—Wellington Chin
*Assistant Examiner*—Raj Jain
(74) *Attorney, Agent, or Firm*—Harness, Dickey & Pierce, PLC

(57) ABSTRACT

A high integrity process is provided to apply pilot phase rates to call processing decisions. An estimate or measurement of the rate of change of a pilot's PN phase offset is used to assist in making CDMA call processing decisions. The phase rate is a measure of the rate of change of a pilot's PN phase offset relative to a mobile time reference and is directly related to the multipath environment and movement of the mobile. Both an integrity algorithm to compute an integrity indicator and a technique to apply the integrity indicator to predict future pilot strengths are included.

17 Claims, 4 Drawing Sheets

INTEGRITY OF PILOT PHASE OFFSET MEASUREMENTS FOR PREDICTING PILOT STRENGTH

CROSS-REFERENCE TO RELATED APPLICATIONS

This application claims benefit of U.S. Provisional application No. 60/245,363, filed Nov. 2, 2000, the content of which is herein incorporated by reference in its entirety.

TECHNICAL FIELD

This invention relates to wireless communication systems, and more particularly to predicting the pilot strength signal condition in a communication system.

BACKGROUND

The use of wireless communication systems is growing with users now numbering well into the millions. One of the most popular wireless communications systems is the cellular telephone, consisting of a mobile station (or handset) and a base station. Cellular telephones allow a user to talk over the telephone without having to remain in a fixed location. This allows users to, for example, move freely about the community while talking on the phone.

The wireless communication systems may communicate using the Code Division Multiple Access (CDMA) standard. CDMA is a communication standard permitting mobile users of wireless communication devices to exchange data over a telephone system wherein radio signals carry data to and from the wireless devices. A set of standards that define a version of CDMA that is particularly suitable for use with the invention include IS95, IS-95A, and IS-95B, Mobile Station-Base Station Compatibility Standard for Dual-Mode Spread Spectrum Systems; TIA/EIA/IS-2000-2, Physical Layer Standard for cdma2000 Spread Spectrum Systems; and TIA/EIA/IS-2000-5 Upper Layer (Layer 3) Signaling Standard for cdma2000 Spread Spectrum Systems, all of which are herein incorporated by reference in their entirety.

CDMA call processing decisions are largely dependent on forward and reverse link signal conditions. For example, a soft-handoff requires that the mobile select pilots that, as a set, will be usable for maintaining a communications link with the base station in the short term. There is, therefore, significant value in being able to predict signal conditions in the short-term in order to make better call processing decisions.

Pilot strengths are often, if not generally, predictable in the short-term. If reliable pilot strength predictions were available, mobile station or base station call processing could use the predictions to make informed decisions such as which pilot(s) to handoff to so that the frame error rate is maintained low and system capacity is minimally impacted.

While an estimate of a pilot's phase rate gives an indication of the velocity component of the mobile in the direction of the signal path from the base station, it may not consistently give a good indication of the expected change in pilot strength from that base station. In order to judge the usefulness of such estimates of phase rates in real-time, the mobile can use an integrity indicator.

SUMMARY

A high integrity process is provided to apply pilot phase rates to call processing decisions. An estimate or measurement of the rate of change of a pilot's PN phase offset, here-after called a pilot's phase rate, is used to assist in making CDMA call processing decisions. The phase rate is a measure of the rate of change of a pilot's PN phase offset relative to a mobile time reference and is directly related to the multipath environment and movement of the mobile. Examples of decisions that could benefit from this information include, but are not limited to, soft, softer, hard, and idle handoffs, or establishing or adapting pilot search priorities or search sequencing. The present invention includes both an integrity algorithm to compute an integrity indicator and a technique to apply the integrity indicator to predict future pilot strengths.

DESCRIPTION OF DRAWINGS

These and other features and advantages of the invention will become more apparent upon reading the following detailed description and upon reference to the accompanying drawings.

DETAILED DESCRIPTION

Figure 1:
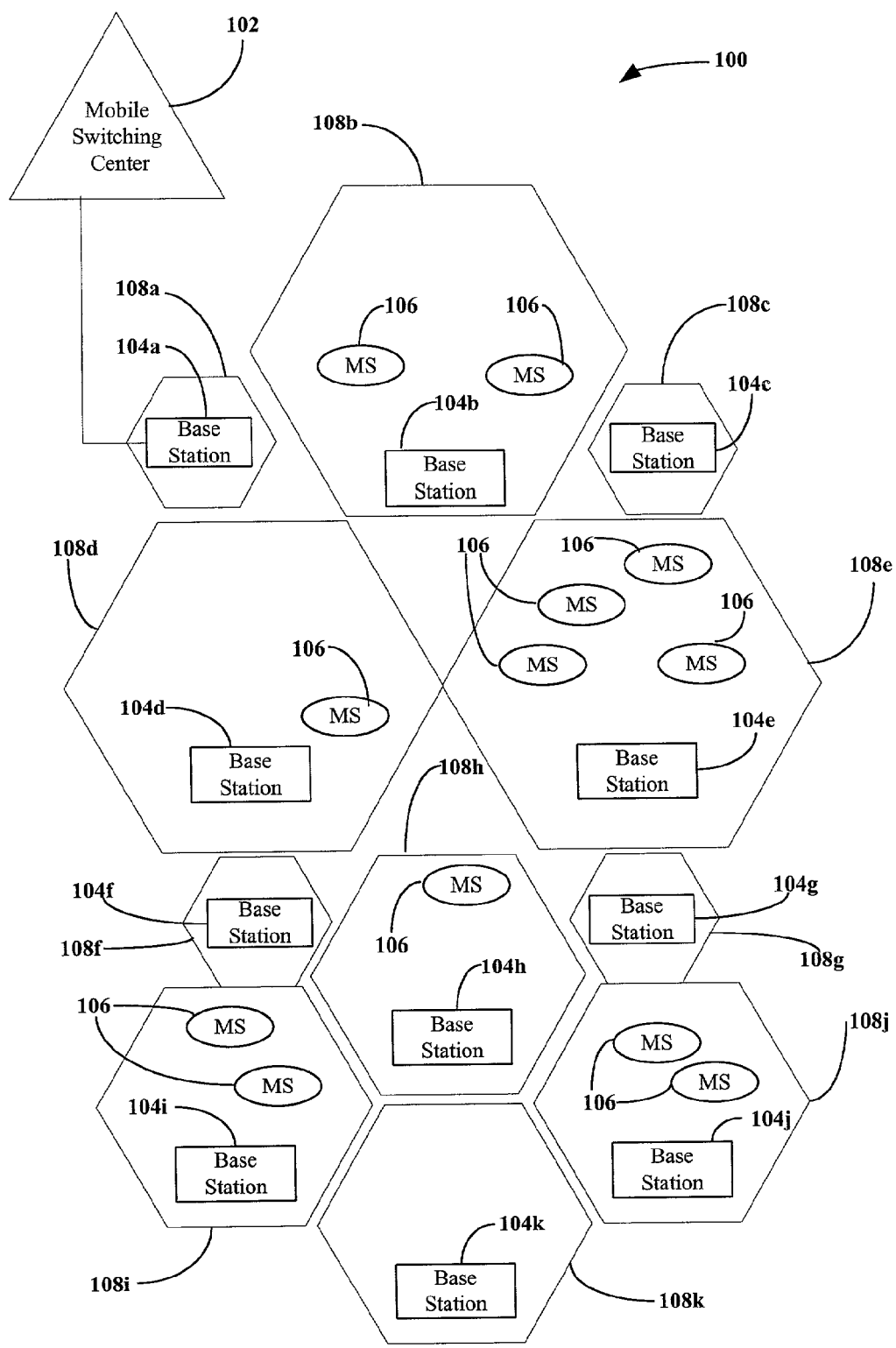
FIG. 1 illustrates the components of an exemplary wireless communication system used by one embodiment of the present invention.

FIG. 1 illustrates components of an exemplary wireless communication system 100. A mobile switching center 102 communicates with base stations 104a–104k (only one connection shown). The base stations 104a–104k (generally 104) broadcasts data to and receives data from mobile stations 106 within cells 108a–108k (generally 108). The cell 108, corresponding to a geographic region, is served by a base station. Practically, said geographic regions often overlap to a limited extent.

A mobile station 106 is capable of receiving data from and transmitting data to a base station 104. In one embodiment, the mobile station 106 receives and transmits data according to the CDMA standards. Under the CDMA standards, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106. One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

At times it is desirable for a different base station 104 to communicate with the mobile station 106. This may be due to the original base station 104 losing signal strength, the mobile station 106 traveling out of range of the original base station 104, or other factors. When the mobile station 106 changes base stations 104, it is referred to as a handoff. Currently, one technique for determining if a handoff is to occur is to monitor the energy level of a pilot signal from a base station. If the energy level of the pilot signal falls below a predetermined threshold for a specific period of time, the mobile station 106 initiates a handoff.

Figure 2:
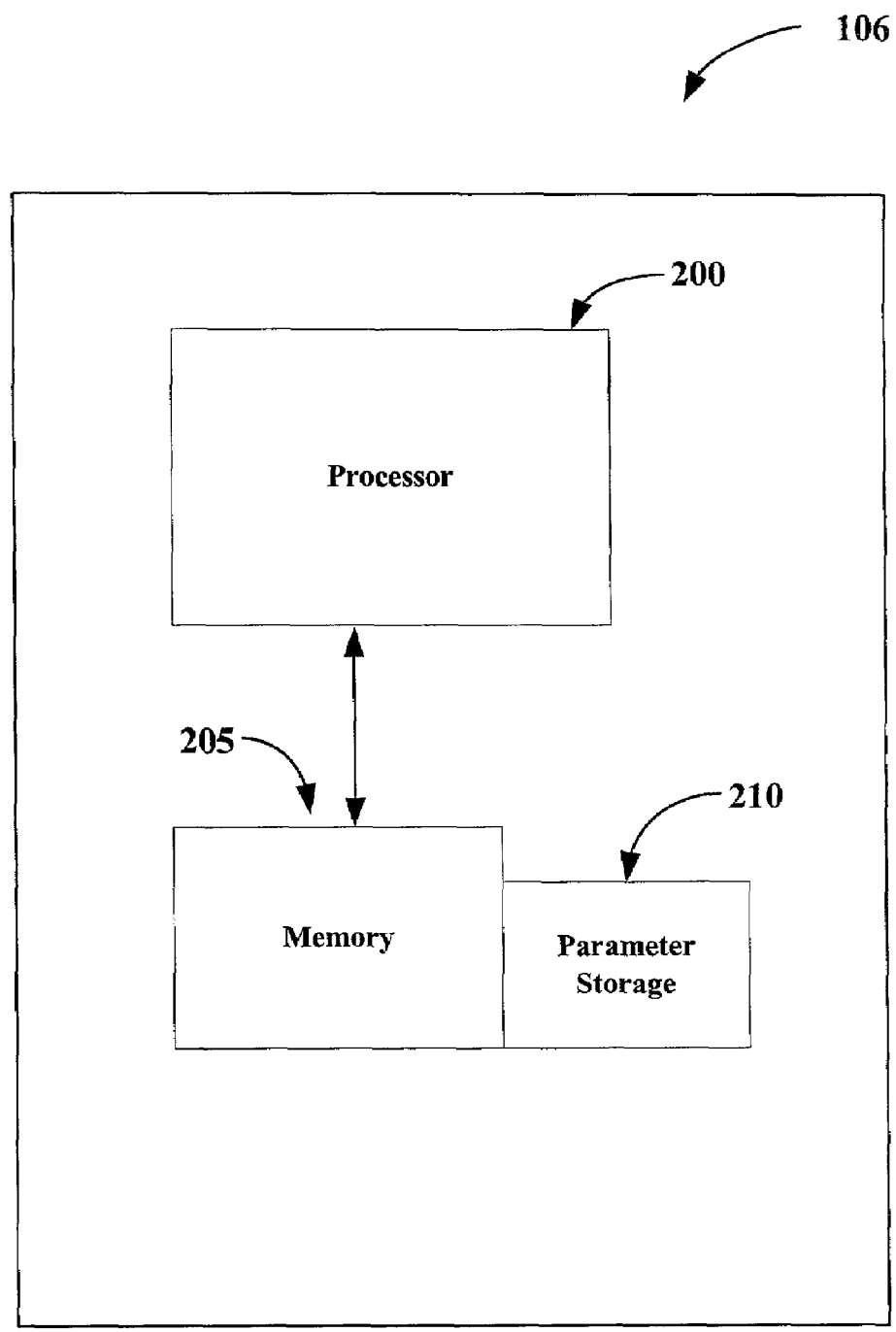
FIG. 2 is a block diagram showing features of a mobile station according to one embodiment of the invention.

FIG. 2 shows a block diagram of the mobile station 106, including a processor 200 and memory 205. The processor 200 may be driven by a program stored in the memory 205. A portion of memory 210 may be used to store search parameters.

Figure 3:
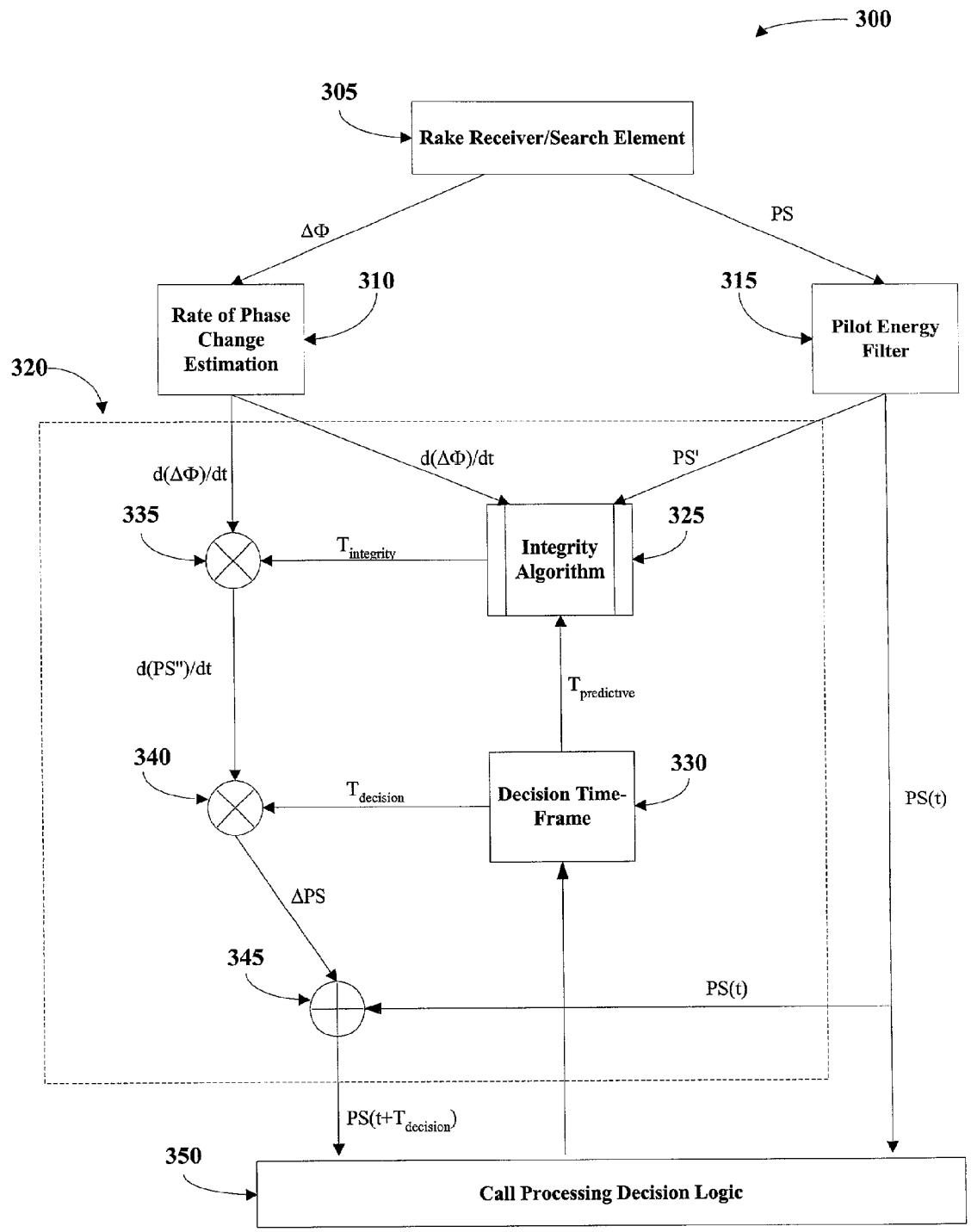
FIG. 3 illustrates a process for determining a pilot phase rate integrity for use in call processing decisions according to one embodiment of the invention.

FIG. 3 illustrates a process 300 for determining a pilot phase rate integrity measure for use in call processing decisions according to one embodiment of the invention. The present invention does not include the mechanism by which phase rate estimates or measurements are determined or the mechanism used for pilot strength measurements. The present invention describes a mechanism that is independent of the means by which pilot PN phase offset and energy measurement inputs are determined.

The integrity mechanism is shown in the context of call processing in FIG. 3. The process 300 begins at block 305, where a Search Element of a mobile station 106 receives a pilot signal from one or more base stations 104. The pilot strength is denoted by PS, pilot PN phase offset is denoted by $\Delta\Phi$, and derivative/rate-of-change is denoted by $d(\Delta\Phi)/dt$. The rake receiver in block 305 takes the pilot signal and processes the signal to obtain the pilot strength PS and the pilot PN phase offset $\Delta\Phi$. The pilot strength PS is then forwarded to a pilot energy filter in block 315, while the pilot PN phase offset $\Delta\Phi$ is sent to a rate of phase change estimator in block 310. The pilot energy filter in block 315 provides filtered pilot energy to both an integrity algorithm in block 325 and the call processing decision logic in block 350. The rate of phase change estimator in block 310 provides the derivative of the pilot PN phase offset, known as the phase rate $d(\Delta\Phi)/dt$ to the integrity algorithm in block 325. The integrity algorithm is part of a pilot energy predictor 320, which also includes a decision time-frame module 330 as well as multipliers 335, 340, and adder 345.

Figure 4:
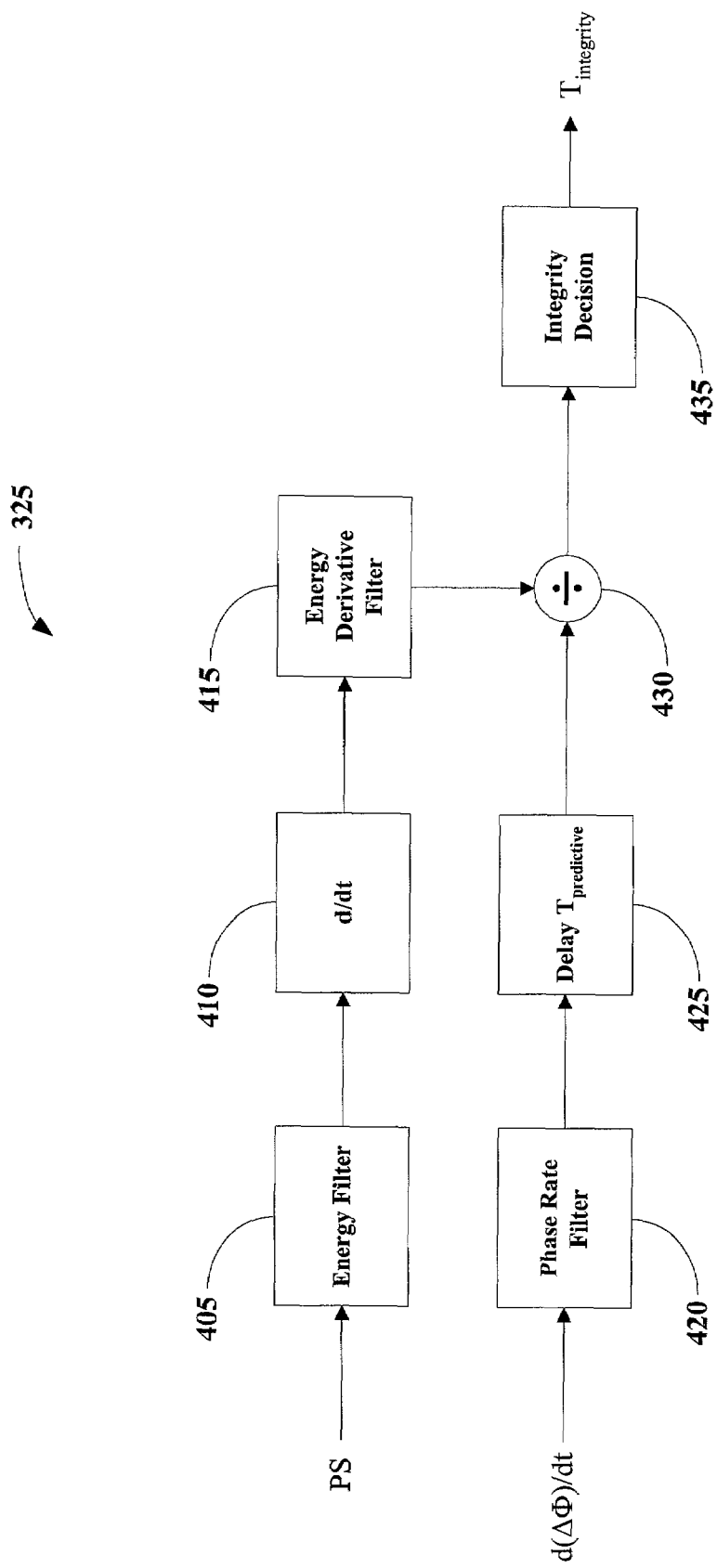
FIG. 4 illustrates a process for determining the integrity algorithm according to one embodiment of the invention.

As indicated above, the integrity algorithm in block 325 takes the pilot energy and phase rate as inputs. The operation of the integrity algorithm 325 is shown in FIG. 4. The algorithm 325 receives the pilot strength PS and may send the PS through an optional filter 405. The algorithm 325 then computes the derivative of the filtered pilot strength (or unfiltered, if the optional filter is not used) in block 410 to obtain a derivative $d(PS(t))/dt$. The algorithm 325 may optionally perform filtering of the derivative $d(PS(t))/dt$ in block 415. The derivative (or filtered derivative) $d(PS(t))/dt$ is then provided as an input to a divider 430.

The algorithm 325 also receives the phase rate $d(\Delta\Phi)/dt$ as an input. The algorithm 325 may filter the phase rate $d\Delta\Phi(t)/dt$ measurements through an optional phase rate filter 420. The phase rate $d(\Delta\Phi)/dt$ (or filtered phase rate) is then optionally delayed in time in block 425. The time delay $T_{predictive}$ is a parameter controlling the timing nature of the rate of change. The $T_{predictive}$ parameter optionally adjusts the time window applicability of the phase rate filter output. This can be envisioned, in one embodiment, as a delay applied to the output of the phase rate filter. The algorithm 325 then computes the ratio of the derivative of the pilot's strength over the pilot's phase rate, i.e. $d(PS(t))/dt/d\Delta\Phi(t-T_{predictive})/dt$ (in this example no filtering is used) at the divider 430. The ratio is taken such that the rate of phase offset change (denominator) is optionally delayed in time (by $T_{predictive}$) relative to the derivative of the pilot energy (numerator). This ratio may additionally be filtered. The integrity algorithm 325 computes this ratio continuously. The ratio is essentially $dPS''/d\Delta\Phi$ which, over time, represents an indication of whether the phase rate and energy change rate are correlated and can be used for predictive means, i.e. to predict each other's future change. For example, in one embodiment, a negative ratio may be considered as indicating an unreliable predictability of either the phase rate or energy change rate based on the other and thus may be ignored or changed to zero (0) to represent this condition mathematically. Optionally, a sustained negative value may be considered as an indication of a reliable value such as might occur when moving toward a cell but closer to a significant signal obstruction such as an underground parking garage.

The calculated ratio is used in block 435 to obtain an integrity decision, outputting a value $T_{integrity}$. The output value $T_{integrity}$ may be based directly on the ratio. The algorithm 325 may either output the ratio directly or choose to output a zero value (0) if the data is a poor indication of future pilot signal strength. For example, if the measurements and processing results indicate that movement in the direction of the signal corresponds to a significant decrease in energy this may indicate that the data may not be currently applicable for prediction. Alternatively, if the ratio is filtered, then it may be directly output.

The output $T_{integrity}$ of the integrity algorithm 325 is multiplied at the multiplier 335 by the current pilot phase rate $d\Delta\Phi(t)/dt$ to determine the predicted rate of change in pilot strength in the short term $d(PS(t))/dt$. This result is then multiplied at multiplier 340 by the time $T_{decision}$ that the mobile station 106 associates with decision making. This will be discussed further below. The result of the multiplication is the predicted change in pilot strength ($\Delta$PS) in the short term. This change is added to the current pilot strength at adder 345 to determine the predicted short-term pilot energy. This prediction is communicated to the call processing decision logic in block 350 for interpretation and decision-making. In the case where the integrity algorithm 325 determines that the ratio is not usable by setting the output to 0, the integrity mechanism will yield a predicted future pilot strength equal to the current pilot strength. The filters and output choice are design parameters of the integrity algorithm 325.

The decision time frame block 330 in FIG. 3 shows that the integrity mechanism may use the mobile call processing state and signal conditions as real-time input for determining the time-frames for both pilot strength prediction and integrity monitoring. The $T_{predictive}$ time is the offset in time that is used for computing the ratio between future change in pilot strength associated with current phase offset change. The $T_{decision}$ time determines how far into the future the pilot strength is predicted. The reason for supporting variability in these parameters is the varying requirements on pilot strength prediction time-frames from a call processing perspective. In cdmaOne or cdma2000 slotted-mode operation, for example, the mobile station 106 may be unable to make pilot strength measurements for a considerable amount of time during the sleeping period. For this reason, predictions may be required far into the future. $T_{decision}$ should be extended so that the prediction is made further into the future and $T_{predictive}$ should be extended so that the integrity algorithm generates an integrity indicator using a longer time-frame. Signal conditions may also have an impact on this time-frame since handoffs during poor signal conditions may take considerable time to perform due to retransmissions by mobile or base station. The time parameters may be adjusted similarly.

A number of embodiments of the invention have been described. Nevertheless, it will be understood that various modifications may be made without departing from the spirit and scope of the invention. Accordingly, other embodiments are within the scope of the following claims.

What is claimed is:

1. A method of making a call processing decisions comprising:
    receiving a pilot energy and a phase rate;
    calculating the derivative of the pilot energy;
    determining a ratio of the derivative of the energy to the phase rate;
    generating an integrity factor based on the ratio;
    predicting a future pilot strength based on the integrity factor; and
    using the future pilot strength to assist in making the call processing decisions.

2. The method of claim 1, further comprising filtering the pilot energy.

3. The method of claim 1, further comprising filtering the phase rate.

4. The method of claim 1, further comprising setting the integrity factor to zero when said ratio and inputs do not adequately predict the future.

5. The method of claim 1, further comprising delaying the phase rate relative to the derivative of the pilot energy.

6. The method of claim 1, further comprising predicting a short term pilot strength based on the integrity factor.

7. The method of claim 6, further comprising setting the short term pilot strength to the current pilot strength when the integrity factor provides a poor indication of future pilot signal strength.

8. A pilot energy predictor comprising:
    an integrity calculator which receives a phase rate and a pilot energy as inputs and determines a ratio of the derivative of the pilot energy to the phase rate and generates an integrity factor based on the ratio.

9. The pilot energy predictor of claim 8, wherein a future pilot energy is estimated based on the integrity factor.

10. The pilot energy predictor of claim 9, wherein the future pilot energy is set to the current pilot energy when the integrity factor provides a poor indication of future pilot signal strength.

11. The pilot energy predictor of claim 8, further comprising:
    a decision time frame which provides a phase rate delay parameter to the integrity calculator; and
    wherein, the integrity calculator delays the phase rate relative to the pilot energy.

12. The pilot energy predictor of claim 8, further comprising a filter for the phase rate.

13. The pilot energy predictor of claim 8, further comprising a filter for the pilot strength.

14. A method of predicting a short term pilot strength comprising:
    determining an amount of time to predict the pilot strength;
    determining the predicted rate of change in the short term pilot strength; and
    calculating the change in short term pilot strength by multiplying the predicted rate of change by the amount of time to predict the pilot strength.

15. The method of claim 14, further comprising combining the change in short term pilot strength with a current pilot strength to generate a predicted short term pilot energy.

16. The method of claim 15, further comprising providing the predicted short term pilot energy to a call processing decision logic.

17. The method of claim 14, further comprising generating the predicted rate of change in pilot strength by multiplying an integrity factor by the current pilot phase rate.

* * * * *